(12) United States Patent
Rahman et al.

(10) Patent No.: US 8,924,115 B2
(45) Date of Patent: Dec. 30, 2014

(54) SYSTEM AND METHOD FOR CONTROLLING A BRAKE SYSTEM

(75) Inventors: Mohammad Rahman, Peoria, IL (US); Mark Behn, Rogers, MN (US); Aaron Gnagey, Metamora, IL (US); James Roal, Chillicothe, IL (US); Kirk Shively, Dunlap, IL (US); Cory Smith, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 13/335,134

(22) Filed: Dec. 22, 2011

(65) Prior Publication Data

US 2012/0330524 A1 Dec. 27, 2012

Related U.S. Application Data

(60) Provisional application No. 61/426,127, filed on Dec. 22, 2010.

(51) Int. Cl.
| | |
|---|---|
| *G06F 7/70* | (2006.01) |
| *G06F 19/00* | (2011.01) |
| *G06G 7/00* | (2006.01) |
| *G06G 7/76* | (2006.01) |
| *B60T 7/12* | (2006.01) |
| *B60W 10/18* | (2012.01) |
| *B60W 30/18* | (2012.01) |
| *B60W 10/103* | (2012.01) |
| *B60T 7/04* | (2006.01) |
| *B60T 13/66* | (2006.01) |
| *B60W 10/184* | (2012.01) |

(52) U.S. Cl.
CPC ............ *B60T 7/042* (2013.01); *B60W 2540/10* (2013.01); *B60W 2540/16* (2013.01); *B60T 7/122* (2013.01); *B60W 10/182* (2013.01); *B60W 30/18027* (2013.01); *B60W 10/103* (2013.01); *B60W 30/18036* (2013.01); *B60W 2710/1005* (2013.01); *B60T 13/662* (2013.01); *B60Y 2200/411* (2013.01); *B60W 2510/186* (2013.01); *B60W 2540/12* (2013.01); *B60W 10/184* (2013.01)
USPC .................. 701/70; 701/67; 701/51; 701/58; 701/12; 477/86; 477/174; 477/176; 477/71

(58) Field of Classification Search
CPC ... B60T 8/1755; B60T 2201/10; B60T 8/174; B60T 8/246; B60W 2550/20; B60W 10/10; B60W 2300/16; B60W 20/00; F16H 2059/006; F16H 1/70; F16H 59/0217; F16H 59/04
USPC ........ 701/70, 41, 94, 1, 102, 76, 93; 180/275, 180/315, 19.1, 204, 21, 2.2, 402, 415; 477/122, 125, 176, 174, 86
See application file for complete search history.

(56) References Cited

U.S. PATENT DOCUMENTS 4,790,420 A * 12/1988 Hata et al. ................. 192/111.12
5,249,658 A * 10/1993 Goeckner et al. ............ 192/3.58
(Continued)

*Primary Examiner* — Calvin Cheung
*Assistant Examiner* — Luis A Martinez Borrero
(74) *Attorney, Agent, or Firm* — Leonard Stewart

(57) ABSTRACT

The disclosure describes, in one aspect, a control system for controlling a braking system. The control system includes a parking brake operatively to at least one wheel, a park brake override mechanism operatively associated with the parking brake, an inching pedal operatively coupled to a transmission, a shift lever operatively coupled to the transmission, at least one sensor operatively coupled to the parking brake to detect when the parking brake is engaged, at least one sensor operatively coupled to the inching pedal to detect a depression of the inching pedal, and at least one sensor operatively coupled to the shift lever for detecting at least one of a forward or reverse gear selection. The control system further includes a controller operatively coupled to the at least one sensors to receive corresponding signals and adapted to control the engagement of the parking brake when the inching pedal is depressed and the at least one of the forward or reverse gear selections is desired.

20 Claims, 3 Drawing Sheets

(56) References Cited

U.S. PATENT DOCUMENTS

| | | | |
|---|---|---|---|
| 5,351,570 A * | 10/1994 | Mizunuma et al. | 74/335 |
| 5,489,007 A * | 2/1996 | Yesel | 180/243 |
| 5,520,593 A * | 5/1996 | Yesel et al. | 477/77 |
| 5,931,250 A * | 8/1999 | Kagawa et al. | 180/167 |
| 6,266,596 B1 * | 7/2001 | Hartman et al. | 701/50 |
| 6,282,968 B1 * | 9/2001 | Sano et al. | 73/862.08 |
| 6,287,236 B1 * | 9/2001 | Ishikawa | 477/71 |
| 6,647,332 B1 | 11/2003 | Esterby et al. | |
| 6,692,051 B1 * | 2/2004 | Kahn et al. | 296/24.39 |
| 6,997,521 B2 | 2/2006 | Jensen et al. | |
| 2001/0030093 A1 * | 10/2001 | Lundholm et al. | 188/156 |
| 2003/0006644 A1 * | 1/2003 | MacGregor et al. | 303/3 |
| 2004/0226768 A1 * | 11/2004 | DeLuca et al. | 180/275 |
| 2005/0011689 A1 * | 1/2005 | Tajima et al. | 180/65.2 |
| 2006/0049691 A1 | 3/2006 | Deprez et al. | |
| 2007/0084450 A1 * | 4/2007 | Oka et al. | 123/675 |
| 2007/0203630 A1 * | 8/2007 | Vitale et al. | 701/50 |
| 2008/0011530 A1 * | 1/2008 | Oka et al. | 180/65.3 |
| 2008/0149437 A1 * | 6/2008 | Herges | 188/138 |
| 2008/0156568 A1 * | 7/2008 | Raz | 180/275 |
| 2008/0262687 A1 * | 10/2008 | Fujita et al. | 701/70 |
| 2009/0314590 A1 * | 12/2009 | Dagh et al. | 188/110 |
| 2010/0197459 A1 * | 8/2010 | Yamaguchi et al. | 477/176 |
| 2010/0262329 A1 | 10/2010 | Monti et al. | |
| 2010/0294602 A1 * | 11/2010 | Gustafsson et al. | 188/158 |

\* cited by examiner

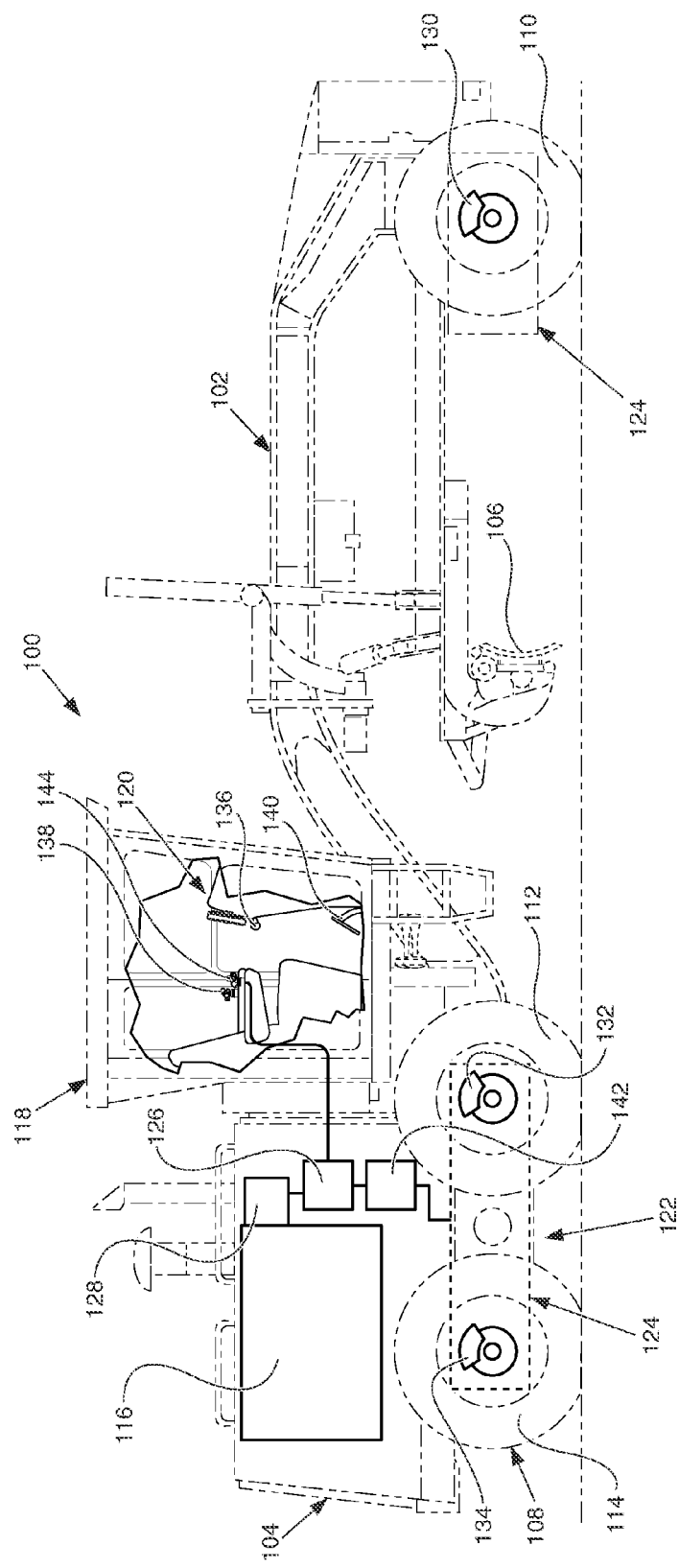

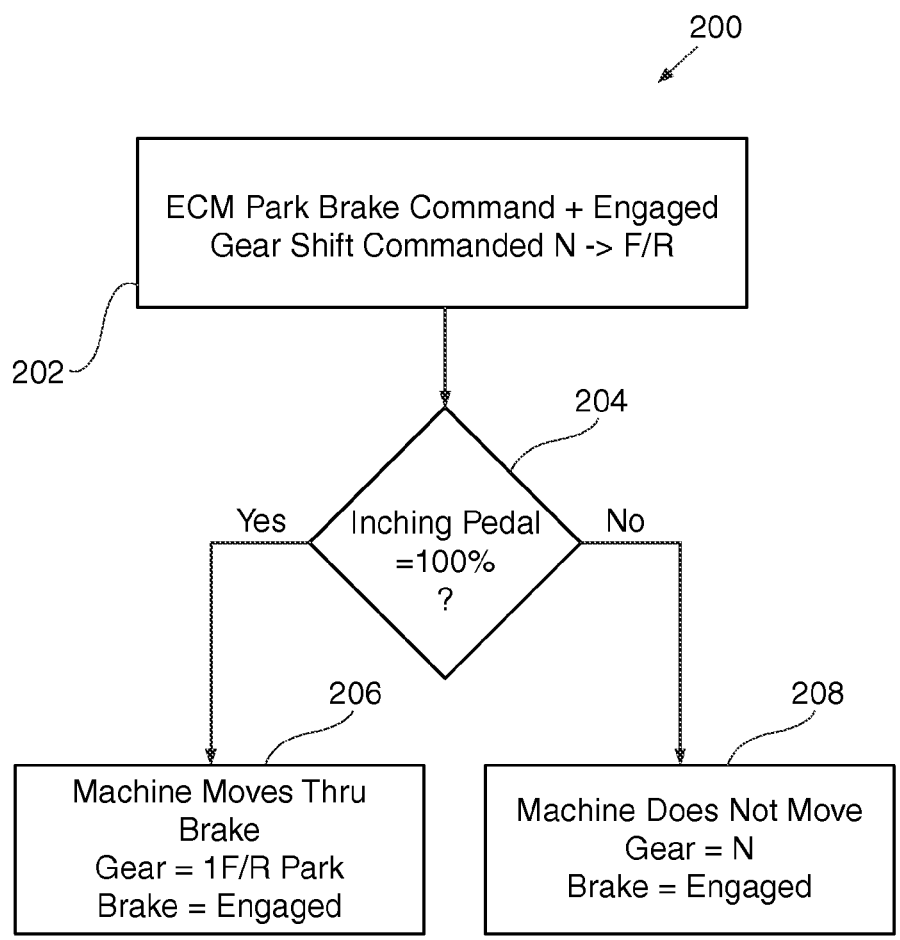

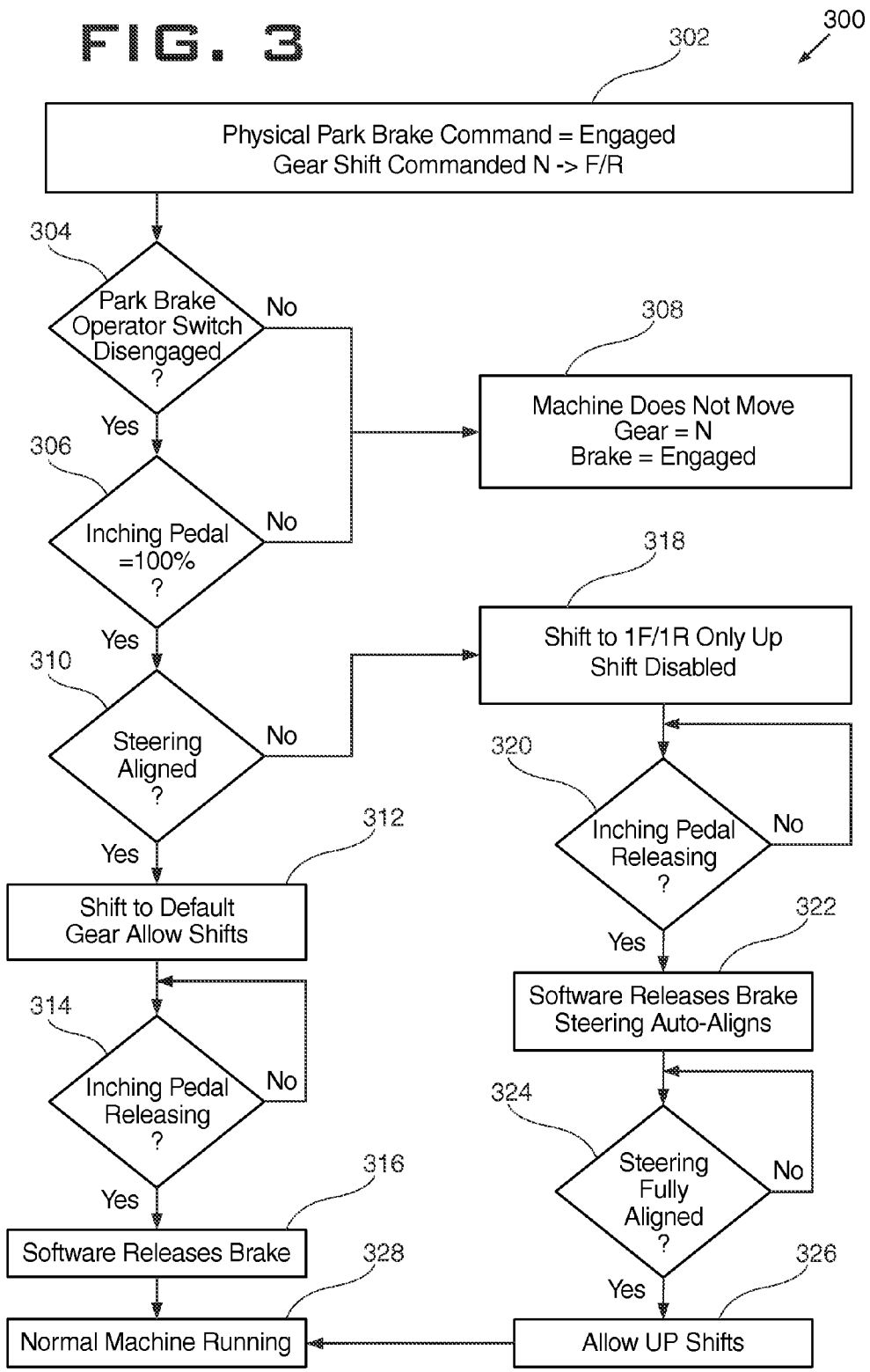

US 8,924,115 B2

SYSTEM AND METHOD FOR CONTROLLING A BRAKE SYSTEM

RELATED APPLICATIONS

This application is based upon and claims the benefit of priority from U.S. Provisional Application No. 61/426,127 by James A Roal et al., filed Dec. 22, 2010, the contents of which are expressly incorporated herein by reference.

TECHNICAL FIELD

This disclosure relates to a brake control system for a machine and, more particularly, to a brake control system for a parking brake of the machine.

BACKGROUND

A machine such as a motor grader, wheel loader, backhoe loader, on- or off-highway truck, or the like is normally equipped with a number of wheels. A parking brake is also associated with at least one of the wheels. The parking brakes are controlled by an operator and is generally designed to hold a stopped machine in the stopped position. Often, an operator will attempt to drive the machine while the parking brake is engaged or actuated. If the parking brake is repeatedly engaged in this manner, wear of and damage to the parking brake components and possible brake failure may result. Therefore it is desirable to provide systems and methods for controlling an engagement of the parking brake so as to avoid undue damage to the parking brake.

The present disclosure is directed to overcoming one or more of the problems set forth above.

SUMMARY

The disclosure describes, in one aspect, a control system for controlling a braking system. The control system includes a parking brake operatively to at least one wheel, a park brake override mechanism operatively associated with the parking brake, an inching pedal operatively coupled to a transmission, a shift lever operatively coupled to the transmission, at least one sensor operatively coupled to the parking brake to detect when the parking brake is engaged, at least one sensor operatively coupled to the inching pedal to detect a depression of the inching pedal, and at least one sensor operatively coupled to the shift lever for detecting at least one of a forward or reverse gear selection. The control system further includes a controller operatively coupled to the at least one sensors to receive corresponding signals and adapted to control the engagement of the parking brake when the inching pedal is depressed and the at least one of the forward or reverse gear selections is desired.

BRIEF DESCRIPTION OF THE DRAWING(S)

FIG. 1 illustrates a side view of a machine having a control system in accordance with an embodiment of the present disclosure.

FIG. 2 is a flow diagram illustrating one embodiment of a control process in accordance with an exemplary embodiment of the present disclosure; and FIG. 3 is a flow diagram illustrating another embodiment of the control process in accordance with an exemplary embodiment of the present disclosure.

DETAILED DESCRIPTION

The disclosure relates to systems and methods for controlling an engagement of a parking brake. An exemplary embodiment of a machine 100 is shown schematically in FIG. 1. The machine 100 may be a mobile machine that performs some type of operation associated with an industry such as mining, construction, farming, transportation, or any other industry known in the art. For example, the machine 100 may be a motor grader, as depicted in FIG. 1, a wheel loader, a scraper, or machine known in the art.

In an illustrated embodiment, the machine 100 includes a front frame 102, a rear frame 104, and a work tool or implement 106. The front 102 and rear 104 frames are supported by wheels 108, which include a pair of front wheels 110 and two pairs of rear wheels 112, 114 (only one side shown). Further, the machine 100 includes a power source such as an engine 116, an operator station or cab 118 containing controls necessary to operate the machine 100, such as, for example, input devices 120 for propelling the machine 100 and other machine components, and the work tool or implement 106, such as, for example, a blade for moving earth. The input devices 120 may include one or more devices embodied as a joystick disposed within the cab 118 and may be adapted to receive input from the operator indicative of a desired work tool 106 or machine 100 movement.

The engine 116 may power a drive system 122 that may include the front wheels 110 and rear wheels 112, 114 adapted to support the machine 100. The wheels 110, 112, 114 may be adapted for steering and maneuvering the machine 100 and for propelling the machine 100 in forward and reverse directions. In the illustrated embodiment, the drive system 122 includes a set of dual rear wheels 112, 114, two wheels on each side of the machine 100, and a set of front wheels 110, one on each side of the machine 100 (only one side shown). The front wheels 110 may be adapted for steering the machine 100.

The power source 116 may embody an engine such as, for example, a diesel engine, a gasoline engine, a gaseous fuel-powered engine, or any other type of combustion engine known in the art. It is contemplated that the power source 116 may alternatively embody a non-combustion source of power (not shown) such as, for example, a fuel cell, a power storage device, or another suitable source of power. The power source 116 may produce a mechanical or electrical power output that may be converted to hydraulic power.

The machine 100 further includes a braking system 124 operatively connected to a control system 126 and adapted to retard movement of the machine 100 or decelerate the machine 100 when the machine 100 is in motion. The control system 126 is operatively connected to the engine 116, the braking system 124, and the cab 118 and receives signals, for example, from one or more sensors 128 and the input devices 120 associated with the cab 118 to monitor and determine, for example, the output power of the engine 116 and to provide appropriate output signals to various systems for controlling the movement of the machine 100 and controlling the movement of the work tool 106, or for accomplishing various other functions and tasks.

The braking system 124 may be associated with the front wheels 110 and the rear wheels 112, 114 and may be operable from other input devices 120 within the cab 118. The braking system 124 may be hydraulically driven. The braking system 124 may include, for example, front brakes 130 and rear brakes 132, 134. The front brakes 130 and rear brakes 132, 134 may, respectively, be operatively associated with the front wheels 110 and rear wheels 112, 114 to selectively retard or decelerate movement of the machine 100.

The braking system 124 may further include a parking brake 136 associated with at least one of the front wheels 110 or the rear wheels 112, 114. The parking brake 136 is adapted to resist motion of the at least one wheel 110, 112, 114 and thereby to resist motion of the machine 100. The front brakes 130, rear brakes 132, 134 and the parking brake 136 may act upon the same wheel 110, 112, 114 or alternately upon different wheels 110, 112, 114. An operator of the machine 100 manipulates the parking brake 136 to command engagement of and disengagement of the parking brake 136. In some embodiments, the parking brake 136 may embody a pedal, lever, dial, toggle, or the like. The control system 126 is operatively connected to the parking brake 136 and produces a parking brake signal representative of the operator's command.

The control system 126 is operatively connected to a shift lever 138 disposed in the cab 118. The shift lever 138 is operatively associated with a transmission (not shown) coupled to the engine 116 and is adapted to shift the transmission between its various gear ratios or gear selections, which may include neutral (N) and a plurality of forward (F) and reverse (R) selections. The one or more sensors 128 may embody a sensor operatively associated with the transmission and the shift lever 138 to indicate a desired or selected gear by the operator.

The control system 126 is further operatively connected to an inching pedal 140. In the illustrated embodiment, the inching pedal 140 embodies a pedal that is moveable from a zero percent depressed position to a 100 percent depressed position. A position sensor 142 may be operatively associated with the inching pedal 140 to determine a corresponding position of the inching pedal 140. The position sensor 142 may responsively provide a position signal to the control system 126 indicative of the operator's desired inching pedal 140 input.

Thus, the control system 126 may receive information from the shift lever 138 and the inching pedal 140 for shifting the transmission to a desired gear and may cause the machine 100 to travel in a desired direction. In some embodiments, the braking system 124 may be operatively connected to an override switch 144, which permits the operator to select a gear and cause the machine 100 to travel in a desired direction even when the parking brake 136 is engaged. The control system 126 may be adapted to selectively disengage or release the parking brake 136 when the override switch 144 is engaged or in a parking brake override mode.

The control system 126 may include one or more control modules (e.g. ECMs, ECUs, etc.). The one or more control modules may include processing units, memory, sensor interfaces, and/or control signal interfaces (for receiving and transmitting signals). The processing units may represent one or more logic and/or processing components used by the control system 126 to perform certain communications, control, and/or diagnostic functions. For example, the processing units may be adapted to execute routing information among devices within and/or external to the control system 126.

Further, the processing units may be adapted to execute instructions, including from a storage device, such as memory. The one or more control modules may include a plurality of processing units, such as one or more general purpose processing units and or special purpose units (for example, ASICS, FPGAs, etc.). In certain embodiments, functionality of the processing unit may be embodied within an integrated microprocessor or microcontroller, including integrated CPU, memory, and one or more peripherals. The memory may represent one or more known systems capable of storing information, including, but not limited to, a random access memory (RAM), a read-only memory (ROM), magnetic and optical storage devices, disks, programmable, erasable components such as erasable programmable read-only memory (EPROM, EEPROM, etc.), and nonvolatile memory such as flash memory.

Industrial Applicability

The industrial applicably of the systems and methods for controlling an engagement of a parking brake described herein will be readily appreciated from the foregoing discussion. Although the machine 100 is shown as a motor grader, the machine 100 may be any type of machine 100 that performs at least one operation associated with, for example, mining, construction, and other industrial applications. The machine 100 may also be associated with non-industrial uses and environments, such as, for example, cranes, earthmoving vehicles, backhoes, and/or material handling equipment. Moreover, the systems and methods described herein can be adapted to a large variety of machines and tasks. For example, wheel loaders, backhoe loaders, compactors, feller bunchers, forest machines, industrial loaders, skid steer loaders, scrapers, and many other machines can benefit from the systems and methods described.

As discussed, one exemplary machine 100 suited to the disclosure is the motor grader. In accordance with certain embodiments, FIG. 2 illustrates an exemplary embodiment of the control system 126 and the process of controlling the parking brake 136 (200). The control system 126 may be adapted to receive a signal or command indicative of an engagement of the parking brake 136 and a gear shift command indicative of a shift from neutral to at least one of the forward or reverse gear selections (Step 202). The control system 126 is further adapted or configured to receive a signal or command indicative of the position of the inching pedal 140 or indicative of whether the inching pedal 140 is depressed (Step 204).

If the inching pedal 140 is depressed (Step 204; Yes), the machine 100 is caused to move even though the parking brake 136 is engaged (Step 206). The control system 126 is adapted to automatically release the parking brake 136. In some embodiments, the inching pedal 140 must be depressed 100 percent to cause the at least one forward or reverse gear selection to be actuated and the machine 100 to move accordingly when the parking brake 136 is engaged. If, however, the inching pedal 140 is not depressed (Step 204; No), the control system 126 is adapted to maintain the neutral gear selection and the machine 100 is not permitted to move with the parking brake 136 engaged.

In accordance with certain embodiments, FIG. 3 illustrates another exemplary embodiment of the control system 126 and the process of controlling the parking brake 136 (300). The control system 126 may be adapted to receive a signal or command indicative of an engagement of the parking brake 136 and a gear shift command indicative of a shift from neutral to at least one of the forward or reverse gear selections (Step 302). If a park brake operator switch is not engaged (Step 304; No) and the inching pedal 140 is not depressed (Step 306; No), then the machine 100 does not move. If, however, the park brake operator switch is engaged (Step 304; Yes) and the inching pedal 140 is depressed (Step 306; Yes), then the control system 126 is adapted to determine if the steering is aligned (Step 310). If the steering is aligned (Step 310; Yes), the control system 126 is adapted to actuate the at least one of the forward or reverse gear selections (received from Step 302) when the inching pedal 140 is being released (Step 314). The control system 126 is adapted to release the parking brake 136 even though the parking brake 136 is engaged (Step 316).

If the steering is not aligned (Step 310; No), the control system 126 is adapted to actuate at least one of a first forward or first reverse gear selection (Step 318) when the inching pedal 140 is being released (Step 320). The control system 126 is adapted to release the parking brake 136 even though the parking brake 136 is engaged (Step 322) and causes the steering to be automatically aligned (Step 322) until fully aligned (Step 324). Once the steering is fully aligned (Step 324; Yes), the control system 126 is adapted to allow up-shifts, which permits the at least one of the forward or reverse gear selections (received from Step 302) to be actuated as normal (Step 328).

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

We claim:

1. A method for controlling a movement of a machine including a braking system, the braking system including a parking brake, the method comprising:
   determining, by a microprocessor, an engagement of the parking brake;
   determining, by the microprocessor, a gear shift from a neutral gear to at least one of a forward gear or a reverse gear;
   determining, by the microprocessor, an engagement of an inching pedal; and
   controlling, by the microprocessor, the movement of the machine, wherein controlling the movement of the machine includes actuating the at least one of a forward or a reverse gear selection according to the gear shift determination and causing the machine to move accordingly in response to the engagement of the inching pedal, wherein controlling the movement of the machine further includes automatically releasing, by the microprocessor, the parking brake in response to the engagement of the inching pedal.

2. The method of claim 1, wherein the engagement of the inching pedal is a function of a percentage of depression of the inching pedal.

3. The method of claim 2, wherein controlling the movement of the machine includes depressing the inching pedal at least one of equal to or more than a threshold percentage of depression.

4. The method of claim 2, wherein controlling the movement of the machine includes depressing the inching pedal more than a threshold percentage of depression.

5. The method of claim 2, wherein controlling the movement of the machine includes depressing the inching pedal 100 percentage of depression.

6. The method of claim 1, wherein controlling the movement of the machine is based on an engagement of a park brake override switch, wherein the parking brake is automatically released in response to the engagement of the inching pedal when engaging the override switch activates a parking brake override mode.

7. The method of claim 1, wherein controlling the movement of the machine is based on an aligned steering, wherein the at least one of a forward or a reverse gear selection is actuated when the steering is aligned.

8. The method of claim 7, wherein controlling the movement of the machine is based on an aligned steering and a released inching pedal, wherein the at least one of a forward or a reverse gear selection is actuated when the steering is aligned and the inching pedal is being released.

9. The method of claim 7, wherein controlling the movement of the machine includes allowing only up-shifts in response to the at least one of a forward or a reverse gear selection.

10. A control system for controlling a movement of a machine including a braking system, the braking system including a parking brake, the control system comprising:
    a position sensor operatively associated with an inching pedal, the position sensor is configured to provide a signal indicative of a position of the inching pedal;
    a sensor operatively associated with a transmission;
    a sensor operatively associated with the parking brake;
    a controller operatively connected to the parking brake, the inching pedal position sensor, the transmission sensor, and the parking brake sensor, the controller configured to:
        determine an engagement of the parking brake from the parking brake sensor;
        determine a gear shift from a neutral gear to at least one of a forward gear or a reverse gear from the transmission sensor;
        determine an engagement of an inching pedal from the inching pedal position sensor; and
        control the movement of the machine based on the gear shift determination and engagement of the inching pedal, wherein controlling the movement of the machine includes actuating the at least one of a forward or a reverse gear selection according to the gear shift determination, automatically releasing the parking brake in response to the engagement of the inching pedal, and causing the machine to move according to the gear shift determination.

11. The control system of claim 10, wherein the engagement of the inching pedal is a function of a percentage of depression of the inching pedal.

12. The control system of claim 11, wherein controlling the movement of the machine includes depressing the inching pedal at least one of equal to or more than a threshold percentage of depression.

13. The control system of claim 11, wherein controlling the movement of the machine includes depressing the inching pedal more than a threshold percentage of depression.

14. The control system of claim 11, wherein controlling the movement of the machine includes depressing the inching pedal 100 percentage of depression.

15. The control system of claim 10, wherein controlling the movement of the machine is based on an aligned steering, wherein the at least one of a forward or a reverse gear selection is actuated when the steering is aligned.

16. The control system of claim 15, wherein controlling the movement of the machine is based on an aligned steering and a released inching pedal, wherein the at least one of a forward or a reverse gear selection is actuated when the steering is aligned and the inching pedal is being released.

17. The control system of claim 15, wherein controlling the movement of the machine includes allowing only up-shifts in response to the at least one of a forward or a reverse gear selection.

18. The control system of claim 17, wherein controlling the movement of the machine according to the detected gear selection includes causing the steering to be automatically aligned until the steering is fully aligned and allowing only the up-shifts when the steering is fully aligned.

19. A control system for controlling a movement of a machine including a braking system, the braking system including a parking brake operatively associated with at least one wheel, the control system comprising:
- a parking brake override mechanism operatively associated with the parking brake;
- an inching pedal operatively coupled to a transmission;
- a shift lever operatively coupled to the transmission;
- at least one sensor operatively coupled to the inching pedal to detect a depression of the inching pedal;
- at least one sensor operatively coupled to the shift lever for detecting at least one of a forward or reverse gear selection;
- a controller operatively coupled to the at least one sensors to receive corresponding signals and configured to:
  - control the engagement of the parking brake when the parking brake override mechanism is activated, the inching pedal is depressed, and the at least one of the forward or reverse gear selections is detected, wherein control the engagement of the parking brake includes automatically releasing the parking brake when the inching pedal is depressed and causing the movement of the machine according to the detected gear selection.

20. The control system of claim 19, wherein controlling the engagement of the parking brake is based on an aligned steering.

* * * * *

UNITED STATES PATENT AND TRADEMARK OFFICE
CERTIFICATE OF CORRECTION

| | | |
|---|---|---|
| PATENT NO. | : 8,924,115 B2 | Page 1 of 1 |
| APPLICATION NO. | : 13/335134 | |
| DATED | : December 30, 2014 | |
| INVENTOR(S) | : Rahman et al. | |

It is certified that error appears in the above-identified patent and that said Letters Patent is hereby corrected as shown below:

On the Title Page, Item 57, lines 7-8, after "parking brake" delete "to detect when the parking brake is engaged".

On the Title Page, Item 57, lines 9-10, after "inching pedal" delete "to detect a depression of the inching pedal".

On the Title Page, Item 57, lines 11-12, after "shift lever" delete "for detecting at least one of a forward or reverse gear selection".

On the Title Page, Item 57, lines 16-17, delete "the at least one of the forward or reverse gear selections is desired." and insert -- at least one of a forward or reverse gear selection is desired. --.

In the Specification

Column 4, line 4, delete "Industrial Applicability" and insert -- INDUSTRIAL APPLICABILITY --.

Signed and Sealed this
Seventeenth Day of November, 2015

Michelle K. Lee
*Director of the United States Patent and Trademark Office*